US011814327B2

(12) United States Patent
Pursell et al.

(10) Patent No.: US 11,814,327 B2
(45) Date of Patent: Nov. 14, 2023

(54) FERTILIZERS CONTAINING ANIMAL NUTRIENT CORE PACKET

(71) Applicant: Pursell Agri-Tech, LLC, Sylacauga, AL (US)

(72) Inventors: Taylor Pursell, Mountain Brook, AL (US); Arthur R. Shirley, Jr., Florence, AL (US); Keith D. Cochran, Killen, AL (US); Joseph M. Miller, Killen, AL (US); Timothy G. Holt, Florence, AL (US); Gregory S. Peeden, Killen, AL (US)

(73) Assignee: Pursell Agri-Tech, LLC, Sylacauga, AL (US)

( * ) Notice: Subject to any disclaimer, the term of this patent is extended or adjusted under 35 U.S.C. 154(b) by 0 days.

(21) Appl. No.: 16/570,090

(22) Filed: Sep. 13, 2019

(65) Prior Publication Data
US 2020/0002238 A1 Jan. 2, 2020

Related U.S. Application Data

(60) Division of application No. 15/601,378, filed on May 22, 2017, now Pat. No. 10,550,043, which is a continuation of application No. 14/135,112, filed on Dec. 19, 2013, now abandoned, which is a continuation of application No. 13/007,492, filed on Jan. 14, 2011, now abandoned.

(60) Provisional application No. 61/295,461, filed on Jan. 15, 2010.

(51) Int. Cl.
C05B 17/00 (2006.01)
C05C 9/00 (2006.01)
C05G 5/30 (2020.01)
C05C 1/00 (2006.01)
C05C 5/02 (2006.01)
C05C 5/04 (2006.01)
C05C 9/02 (2006.01)
C05D 9/02 (2006.01)

(52) U.S. Cl.
CPC .......... C05B 17/00 (2013.01); C05C 1/00 (2013.01); C05C 5/02 (2013.01); C05C 5/04 (2013.01); C05C 9/00 (2013.01); C05C 9/005 (2013.01); C05C 9/02 (2013.01); C05D 9/02 (2013.01); C05G 5/30 (2020.02)

(58) Field of Classification Search
CPC .. C05B 17/00; C05D 9/02; C05C 9/02; C05C 9/00; C05C 5/04; C05C 5/02; C05C 1/00; C05C 9/005; C05G 3/0041
See application file for complete search history.

(56) References Cited

U.S. PATENT DOCUMENTS

| 3,006,753 | A | * | 10/1961 | Harvey | C05B 1/02 71/29 |
| 3,852,498 | A | | 12/1974 | Barham et al. | |
| 3,962,484 | A | * | 6/1976 | Grosso | A23K 10/33 426/74 |
| 5,034,045 | A | | 7/1991 | Alexander | |
| 5,154,752 | A | * | 10/1992 | Scheibler | B01J 2/28 71/60 |
| 5,204,183 | A | * | 4/1993 | McDougall | C09K 8/62 424/408 |
| 5,917,110 | A | | 6/1999 | Kust | |
| 6,576,035 | B2 | | 6/2003 | Hartmann et al. | |
| 6,844,302 | B1 | | 1/2005 | Boden et al. | |
| 7,785,388 | B2 | | 8/2010 | Hartmann et al. | |
| 2008/0016765 | A1 | * | 1/2008 | Hartmann | C05F 3/00 47/58.1 SC |
| 2008/0216536 | A1 | * | 9/2008 | Birthisel | A01N 25/12 71/64.03 |

OTHER PUBLICATIONS

Shirley Jr, A. Ray, Luther M. Nunnelly, and Fred T. Carney Jr. "Melt granulation of urea by the falling-curtain process." Industrial & Engineering Chemistry Product Research and Development 21.4 (1982): 617-620. (Year: 1982).*
Nakamura, Shuhei. "The TOYO Urea Granulation Technology." 20th Arab Fertilizer International Annual Technical Conference, Tunisia. 2007. (Year: 2007).*
CJTech. "Fluid Bed Coating" <http://www.cjtech.co.kr/Technical Process Fluid Bed Coating.htm> Feb. 8, 2008 (Year: 2008).*
Licata, Mario, et al. "Treatment of Combined Dairy and Domestic Wastewater with Constructed Wetland System in Sicily (Italy). Pollutant Removal Efficiency and Effect of Vegetation." Water 13.8 (2021): 1086. (Year: 2021).*
El Zakhem, Henri, et al. "Design of New Baby Food Product Using Whey." International Journal of Industrial and Manufacturing Engineering 11.9 (2017) (Year: 2017).*

(Continued)

Primary Examiner — Jennifer A Smith
(74) Attorney, Agent, or Firm — Leason Ellis LLP

(57) ABSTRACT

A fertilizer supplying animal nutrients including a core particle having an outer surface and comprising compounds containing animal nutrients, and a coating of urea on the outer surface of the core particle, and further a process of making the fertilizer including the steps of: screening animal nutrient core particles comprising a powdered substance containing an animal nutrient, to a preselected particle size; spraying melted urea onto the surface of the nutrient core particles to produce a coating on the nutrient core particles; granulating the nutrient core particles with sprayed melted urea to produce nutrient core granules; and cooling the nutrient core granules.

9 Claims, No Drawings

(56) References Cited

OTHER PUBLICATIONS

Cooke et al., "Performance of lactating dairy cows fed whole cottonseed coated with gelatinized starch plus urea or yeast culture," Journal of Dairy Science 90.1 (2007):360-364.
Cornstarch Nutrition Facts, http://www.freefoodfacts.com/cornstarch/, Accessed Apr. 17, 2019, pp. 1-7.
Mosaic, "Material Safety Data Sheet Feed Urea 46%," (Apr. 2006) pp. 1-9.
Rose Mill Co. Product Information, 08<http://www.thomasnet.com/profile/01191046/rose-mill-co.html?what=Urea+Chemicals&cov=NA&heading=96003363&searchops=4&ci=1191046>.
Whitsitt, "Vitamin B (B1) and G (B2) content of cotton-seed products," Industrial & Engineering Chemistry 25.10 (1933):1169-1171.

* cited by examiner

FERTILIZERS CONTAINING ANIMAL NUTRIENT CORE PACKET

CROSS-REFERENCE TO RELATED APPLICATIONS

This application is a divisional of U.S. Ser. No. 15/601,378 filed 22 May 2017, which is a continuation of U.S. Ser. No. 14/135,112 filed 19 Dec. 2013, which is a continuation of U.S. Ser. No. 13/007,492 filed 14 Jan. 2011, which claims benefit of U.S. provisional application No. 61/295,461 filed 15 Jan. 2010. The contents of the above patent applications are incorporated by reference herein in their entirety.

BACKGROUND OF THE INVENTION

This invention relates to fertilizer compositions that have been developed to increase nutrients required by humans and/or domesticated animals in food plants, which is easily tailored for application to particular agricultural land, deficient in specific human/domesticated animal nutrients. In this respect, the invention is a delivery system that can be easily adjusted to deliver human/domesticated animal nutrients that have been determined to be deficient, in a determined appropriate amount to increase the amount of the nutrients in food plants in order to alleviate or eliminate the deficiency in the human/domesticated animal diet. The compositions include plant growth fertilizers that promote plant growth in addition to the delivered human/domesticated animal nutrients.

Additionally, the invention includes processes of making the fertilizer compositions containing animal nutrients.

The invention further includes methods of alleviating or eliminating deficiencies in animal nutrients by means of increasing the amounts of the nutrients in food plants.

On a worldwide basis, the demand for the present fertilizer containing animal nutrients is tremendous, as emphasized in the following excerpts regarding deficiencies of iodine, iron, zinc and vitamin A, from the World Health Organization, World Health Report 2002.

Iodine deficiency has been associated with mental retardation and brain damage, lower mean birth weight and increased infant mortality, hearing impairment, impaired motor skills, and neurological dysfunction. Over 2.2 billion people in the world may be at risk for iodine deficiency, and estimates suggest over one billion experience some degree of goiter. Globally, iodine deficiency disorders were estimated to result in 2.5 million Disability Adjusted Life Years ("DAYLs," i.e., the sum of years of potential life lost due to premature mortality and the years of productive life lost due to disability) which is 0.2% of total global DAYLs. Approximately 25% of this burden occurred in Africa, 17% in South-East Asia and 16% in the Eastern Mediterranean.

Iron deficiency is one of the most prevalent nutrient deficiencies in the world, affecting an estimated two billion people. Young children and pregnant and postpartum women are the most commonly and severely affected because of the high iron demands of infant growth and pregnancy. Iron deficiency may, however, occur throughout the life span where diets are based mostly on staple foods with little meat intake or people are exposed to infections that cause blood loss (primarily hookworm disease and urinary schistosomiasis). About one-fifth of prenatal mortality and one-tenth of maternal mortality in developing countries is attributable to iron deficiency. There is also a growing body of evidence indicating that iron deficiency anemia in early childhood reduces intelligence in mid-childhood. There is also evidence that iron deficiency decreases fitness and aerobic work capacity through mechanisms that include oxygen transport and respiratory efficiency within the muscle. In total, 0.8 million (1.5%) of deaths worldwide are attributable to iron deficiency, 1.3% of all male deaths and 1.8% of all female deaths. Attributable DALYs are even greater, amounting to the loss of about 35 million healthy life years (2.4% of global DALYs). Of these DALYs, 12.5 million (36%) occurred in South-East Asia, 4.3 million (12.4%) in the Western Pacific, and 10.1 million (29%) in Africa.

Zinc deficiency is largely related to inadequate intake or absorption of zinc from the diet. Zinc requirements for dietary intake are adjusted upward for populations in which animal products (the best sources of zinc) are limited, and in which plant sources of zinc are high in phytates (strong chelators). It is estimated that zinc deficiency affects about one-third of the world's population, with estimates ranging from 4% to 73% across regions. Mild to moderate zinc deficiency is quite common throughout the world. Worldwide, zinc deficiency is responsible for approximately 16% of lower respiratory tract infections, 18% of malaria and 10% of diarrheal disease. The highest attributable fractions for lower respiratory tract infection occurred in Africa, the Americas, the Eastern Mediterranean and South-East Asia (18-22%); likewise, the attributable fractions for diarrheal diseases were high in these four regions (11-13%). Attributable fractions for malaria were highest in Africa and the Eastern Mediterranean (10-22%). In total, 1.4% (0.8 million) of deaths worldwide were attributable to zinc deficiency: 1.4% in males and 1.5% in females. Attributable DALYs were higher, with zinc deficiency accounting for about 2.9% of worldwide loss of healthy life years. Of this disease burden, amounting to 28 million DALYs worldwide, 34.2% occurred in South-East Asia, and 49.1% in Africa.

Vitamin A is an essential nutrient required for maintaining eye health and vision, growth, immune function, and survival. Severe vitamin A deficiency can be identified by the classic eye signs of xerophthalmia, such as corneal lesions. Milder vitamin A deficiency is far more common. Vitamin A deficiency causes visual impairment in many parts of the developing world and is the leading cause of acquired blindness in children. Children under five years of age and women of reproductive age are at highest risk of this nutritional deficiency and its adverse health consequences. Globally, approximately 21% of all children suffer from vitamin A deficiency (defined as low serum retinol concentrations), with the highest prevalence of deficiency, and the largest number affected in South-East Asia (78%) and in Africa (63%). There is a similar pattern for women affected by night blindness during pregnancy, with a global prevalence of approximately 5% and the highest prevalence among women living in Asia and Africa where maternal mortality rates are also high. It is estimated that vitamin A deficiency also caused about 16% of worldwide burden resulting from malaria and 18% resulting from diarrheal diseases. Attributable fractions for both diseases were 16-20% in Africa. In South-East Asia, about 11% of malaria was attributed to vitamin A deficiency. About 10% of maternal DALYs worldwide were attributed to vitamin A deficiency, again with the proportion highest in South-East Asia and Africa. Other outcomes potentially associated with vitamin A deficiency are fetal loss, low birth weight, preterm birth and infant mortality. In total, about 0.8 million (1.4%) of deaths worldwide result from vitamin A deficiency, 1.1% in males and 1.7% in females. Attributable DALYs are higher: 1.8% of global disease burden. Over 4-6% of all disease burden in Africa was estimated to result from vitamin A deficiency.

Thus, much of the world's population is lacking in micronutrients and iodine, which can cause a variety of illness or death. This is generally a direct result of consuming food crops that were grown in micronutrient and/or iodine deficient soils. Primary micronutrients which may be deficient include iron, zinc, copper, magnesium and selenium. Food crops grown in deficient soils not only have reduced crop yields, but also have low micronutrient and/or iodine content needed for human health.

A quick acting and cost effective method to alleviate this problem is to use enriched fertilizers containing micronutrients and/or iodine as well as vitamins and other beneficial additives. These human nutrients are transferred from the soil, through plant uptake, to the edible fruit, vegetable, seed, leaves, stalk or other portion of the food crop plant. Similarly, domesticated animals that have nutrient deficiencies will have improved health and productively by consuming food plants that have received increased amounts of the deficient nutrients. Moreover, human consumption of the nutrient healthy animals will increase human health. The present invention employs a new and particularly effective means of providing selected types and amounts of animal nutrients to food crops and concurrently providing plant nutrients for crop high yield.

BRIEF SUMMARY OF THE INVENTION

The present invention is directed towards a new and entirely unexpected fertilizer composition wherein a core particle is composed of selected types and amounts of animal micronutrients, iodine and/or vitamins which is coated with plant growth fertilizer, particularly urea as a nitrogen plant nutrient, but may also include other plant nutrients of, for example, phosphorus and potassium. Thus, a combined animal nutrient and plant nutrient fertilizer may be tailored and applied to agricultural areas to fulfill the specific needs of animal (particularly human) and food plant (crop) nutrition. The core packet of selected animal nutrients may be produced with only a small coating of urea as an intermediate product for future processing or such intermediate product may be further processed substantially in a continuous manner to the final fertilizer product. For convenience only, hereafter, nutrients for increased health of humans and domestic animals will be referred to as human nutrients and nutrients for increased food plant will be referred to as plant nutrients.

The physical structure of the present fertilizer product is novel and the process of the present invention that was developed for making the product, including the nutrient core packet and one or more coatings, includes novel granulation steps.

The present invention further includes a method of delivering human/domesticated animal nutrients that have been determined to be deficient, in a determined appropriate amount to increase the amount of the nutrients in crops, in order to alleviate or eliminate the deficiency in the human/domesticated animal diet.

DETAILED DESCRIPTION OF THE INVENTION

While in the manufacture of fertilizers, the granulation of urea is known, the simple addition of micronutrients, iodine, or other essential nutrients to a urea granulation process can potentially cause processing problems such as agglomeration, dusting, excess moisture and low production rate. Physical properties of the resulting urea granules can also be affected such as reduced particle strength, dust formation, caking in storage, or more susceptibility to humidity. Further, additives, such as human nutrient compounds, can also be damaged from the high urea melt temperature (275 to 290 F).

The present invention particularly relates to a new delivery system for incorporating micronutrients and/or iodine or any other beneficial materials into fertilizers to provide highly effective availability of the nutrients to crop plants and uptake of the nutrients into the plant. The delivery system consists of a core packet comprised of animal nutrients (nutrients in the broad sense of substances in food that aid in healthy growth and health maintenance of animals). The core packet particles are produced by granulating (e.g. drum granulation) the nutrient core ingredients, optionally with a binder (e.g., monoammonium phosphate (MAP)). On a dry basis the binder is 0.3 to 0.9% by wt. and preferably 0.5 to 0.7% by wt. The resulting core packet particle size is in the range of 0.7 mm to 1.5 mm and preferably in the range of 0.9 mm to 1.2 mm in diameter depending on the desired additive concentration.

The core particles are over coated with urea. This first coating of urea is to build up the particle size for improved processing by such means as a high or even low flow fluid bed reactor to produce the fertilizer product granules. The size of core particles with the first coating of urea is 0.9 to 1.5 mm and preferably 1.0 to 1.2 mm. The core particles with urea overcoat is an intermediate product, which may be stored or processed substantially immediately to a final fertilizer granular product.

The core particles with first coating of urea are introduced to a urea granulation process, to be coated a second time with urea and optionally including other plant macronutrients such as phosphorus and potassium to yield the fertilizer granular product. The fertilizer granules each contain a core packet particle near the center of the granule. The final product granule size ranges from 2.50 to 3.60 mm and preferably 2.5 to 2.8 mm.

The urea employed in the coating may optionally be substituted or supplemented with coating materials selected from the group consisting of ureaform, water soluble urea formaldehyde polymer, water insoluble urea formaldehyde polymer, methylene urea, methylene diurea, dimethylenetriurea and urea formaldehyde.

The plant macronutrient compounds include the following:

1) nitrogen compounds selected from the group consisting of urea, ammonia, ammonium nitrate, ammonium sulfate, calcium nitrate, diammonium phosphate, monoammonium phosphate, potassium nitrate and sodium nitrate;

2) phosphorous compounds selected from the group consisting of diammonium phosphate, monoammonium phosphate, monopotassium phosphate, dipotassium phosphate, tetrapotassium pyrophosphate, and potassium metaphosphate.

3) potassium compounds selected from the group consisting of potassium chloride, potassium nitrate, potassium sulfate, monopotassium phosphate, dipotassium phosphate, tetrapotassium pyrophosphate, and potassium metaphosphate.

The core packet particles may be manufactured as an intermediate product for later coating with urea or a tailored urea-macronutrient formulation for application to a specific agricultural area, worldwide. The fertilizer product granules may optionally receive an outer coating of a substance having reduced solubility or otherwise of slower degradation to provide a slow or controlled release of the fertilizer, e.g., sulfur or polymer coatings.

Micronutrient sources include iron sulfate, iron oxides, chelated iron, zinc sulfate, iron nitrate, zinc oxide, chelated zinc, copper oxide, copper sulfate, copper nitrate, magnesium nitrate, magnesium sulfate, magnesium oxide, selenium sulfate and selenium oxide. Iodine sources include potassium iodide or sodium iodide. The proportion of total micronutrients in the fertilizer product range from 0.01 to 10.0% by wt. and preferably range from 0.1 to 5.0% by wt. Core packet particles prepared for regions that have iodine deficient soils typically contain 0.01 to 5% by wt. iodine, and more preferably contain 0.01 to 1.0% by wt. Core packet particles typically contain 0.01 to 10% wt. zinc and more preferably 0.01 to 5% wt. zinc. Core packet particle typically contain 0.01 to 10% wt iron and more preferably contain 0.01 to 4% wt. iron.

Core packet particles may also include a vitamin-mineral composition to alleviate or eliminate human vitamin deficiencies. One or more vitamins are selected from such vitamins as vitamins A, C, D, E and K, thiamin, riboflavin, niacin, vitamin B6 and B12, folic acid (vitamin B9), pantothenic acid (vitamin B5) and biotin (vitamin B7). In addition to the previously disclosed mineral nutrients of iron, zinc and iodine additional mineral nutrients are selected from calcium, phosphorus, magnesium, selenium, copper, manganese, chromium, molybdenum, chloride, potassium, boron, nickel, silicon, tin, vanadium, and carotenoids such as lutien, and lycopene.

See Table 1 for an exemplary list of components and exemplary amounts as may constitute a complete human multivitamin.

TABLE 1

Vitamin-Mineral Composition
"Equate ™ Complete Mutlivitamin"
Supplement Facts
Serving Size: 1 Tablet

| Amount Per Serving: | | % DV |
|---|---|---|
| Vitamin A (29% as Beta Carotene) | 3500 I.U. | 70% |
| Vitamin C | 90 mg | 150% |
| Vitamin D | 400 I.U. | 100% |
| Vitamin E | 30 I.U. | 100% |
| Vitamin K | 25 mcg | 31% |
| Thiamin(Vit. B1) | 1.5 mg | 100% |
| Riboflavin(Vit. B2) | 1.7 mg | 100% |
| Niacin | 20 mg | 100% |
| Vitamin B6 | 2 mg | 100% |
| Folic Acid | 500 mcg | 125% |
| Vitamin B12 | 6 mcg | 100% |
| Biotin | 30 mcg | 10% |
| Pantothenic Acid | 10 mg | 100% |
| Calcium | 200 mg | 20% |
| Iron | 18 mg | 100% |
| Phosphorus | 109 mg | 11% |
| Iodine | 150 mcg | 100% |
| Magnesium | 100 mg | 25% |
| Zinc | 11 mg | 73% |
| Selenium | 55 mcg | 79% |
| Copper | 0.9 mg | 45% |
| Manganese | 2.3 mg | 115% |
| Chromium | 35 mcg | 29% |
| Molybdenum | 45 mcg | 60% |
| Chloride | 72 mg | 2% |
| Potassium | 80 mg | 2% |
| Boron | 150 mcg | ** |
| Nickel | 5 mcg | ** |
| Silicon | 2 mg | ** |

TABLE 1-continued

Vitamin-Mineral Composition
"Equate ™ Complete Mutlivitamin"
Supplement Facts
Serving Size: 1 Tablet

| Amount Per Serving: | | % DV |
|---|---|---|
| Tin | 10 mcg | ** |
| Vanadium | 10 mcg | ** |
| Lutein ‡ (*Tagetes erecta*) (flower) | 250 mcg | ** |
| Lycopene | 300 mcg | ** |

** Daily Value (DV) not established.

Other Ingredients:

Dicalcium Phosphate, Magnesium Oxide, Potassium Chloride, Calcium Carbonate, Cellulose, Ascorbic Acid, Ferrous Fumarate, Corn Starch, di-AlphaTocopheryl Acetate, Niacinamide, Polyvinyl Alcohol, Gelatin, Croscarmellose Sodium, d-Calcium Pantothenate, Crospovidone, Zinc Oxide, Magnesium Stearate, Titanium Dioxide, Polyethylene Glycol, Talc, Manganese Sulfate, Silicon Dioxide, *Acacia*, Maltodextrin, Hypromellose, Pyridoxine Hydrocholride, Glucose, CupricSulfate, Riboflavin, ThiamineMononitrate, VitaminAAcetate, BoricAcid, Sucrose, Folic Acid, Beta Carotene, Yellow 6 Lake, Chromium, Picolinate Lycopene, Lutein, Potassium Iodide, Sodium Selenate, Sodium Molydate, Tricalcium Phosphate, Sodium Asorbate, Tocopherols, Red 40 Lake, Phytonadione, Biotin, Sodium Metavanadate, Nickelous Sulfate, Stannous Chloride, Cholecalciferol, Cyanocobalamin, Ascorbyl Palmitate There is substantial flexibility in the manufacture of the core packets to specifically tailor products to be produced for different agricultural areas of the world, which have varying soil and weather conditions. The present fertilizer products containing nutrient core packets can be produced by a number of typical fertilizer manufacturing processes including fluid bed granulation, drum granulation, and pan granulation. While the unit operations comprise typical fertilizer manufacturing processes, the combination of operations is novel to produce the product of the present invention.

The micronutrient core packet particles are primarily formed by granulating a fine powder (or fine crystals) of various micronutrients and/or iodine using a binder such as corn syrup (e.g., 20-30% fructose or 3-9% dry basis), other sugars (such as sucrose), starches, lignosulfonates (such as calcium or potassium or ammonium lignosulfonates), PVA (polyvinyl acetate), methyl cellulose, MAP (monoammonium phosphate) and any other binders commonly used for granulation. Binder content ranges from 1 to 10% by wt. and preferably ranges from 3 to 6% by wt. The granulation method for preparing the core packets is selected from commonly used techniques such as drumgranulation, pan granulation, pin-mixer, extrusion, compaction, fluid bed granulation and prilling. The core packet particles are pre-coated by processes for example of drum granulation, pan granulation or fluid bed granulation, with a small amount of urea (5 to 25% by wt.) to give the particle a sufficient size to be further processed, immediately or later in a urea production facility (by such means as drum granulation, pan granulation or fluid bed granulation), to prevent particle damage or entrainment in a process air stream causing removal from the granulator.

If the raw material for the nutrient compound is in (fine) powder form, then granulation is required in order to increase the nutrient core particle size to the desired size before coating with urea. Alternatively, if the raw nutrient material is in a larger form, e.g. crystals, then granulation is not necessary and the raw nutrient material is only screened to result in the desired nutrient core particle size.

The resulting nutrient core particles are then sprayed with melted urea and granulated to result in a granulated nutrient core fertilizer final product or intermediate product. If an intermediate product, a second coating of urea is sprayed on the intermediate granules, followed by further granulation to the final twice coated product. In both cases, after spraying with melted urea and granulation, the resulting granules are cooled. In a commercial process, the granules would be cooled in a fluid bed cooler.

EXAMPLES

Samples of the product of the present application were generally made employing the following protocol.

Samples of fertilizer granular products were produced comprised of core packet particles composed of a binder and compounds containing the desired nutrients with over-coatings of urea. For one exemplary example, for core packet particles, the binder is mono-ammonium phosphate (MAP) and/or corn syrup, and human nutrients are potassium iodide, zinc sulfate, iron sulfate and a vitamin-mineral composition.

The core packet particles were produced by granulating powdered nutrient compounds (and optionally other nutrient constituents) with the binder to form the core packet particles which were then screened to a specific size or range of sizes.

Alternatively, the particles of single powdered nutrient compound (or other nutrient constituent) were not granulated but were instead only screened to select a specific size or range of sizes to be the core packetparticles.

Whether produced by granulation with subsequent screening or resulting from only screening, the core packet particles were over-coated with urea.

Industrial grade urea was melted and sprayed to overcoat the core packet particles. The urea over-coating drum was 20" in diameter, 5" wide, 2" deep, with forty-1" lifting flights mounted 1½" apart inside the drum to assist in forming a falling curtain during melt spray granulation. The same type of drum was used to make the core packet particles except that the drum contained no flights. The stainless steel granulation drum was mounted on a variable speed base.

Approximately 1 pound of core packet particles was placed inside the drum to form a falling curtain. The drum speed during granulation was 35-40 rpm. The sample fertilizer granules were produced by this process. After granulation, the granules were allowed to cool.

Product samples were made with the constituents and amounts shown in Table 2. The samples are designated by product number NP3-16. Note that these samples were all produced based on the volume of the final product granule. For exemplary purposes the desired final product size was a mean particle size of 2.80 mm. With this product size fixed the nutrient core size was adjusted to vary the iron, zinc, and iodine content. In examples employing iron, zinc or iodine, the compound was screened or granulated and then screened, and then the iron, zinc or iodine content was determined by volume of the nutrient core in relation to the final product size. This resulted in amounts of constituents in the sample compositions to be stated on a percent weight basis, estimated plus/minus 10-15%.

While the samples of the Examples were produced in this manner, on a full scale production basis the nutrient cores would be screened or granulated and then screened just as in the examples, but the cores would be metered in the process on a percent weight basis.

The following are examples, representative of making product samples.

Example 1. (Product NP-3, NP-4, and NP-5)

Samples were produced containing 1, 3, and 5% iron from iron sulfate core packet. Iron sulfate crystals were screened to a pre-determined size prior to being over-coated with urea. Sample NP-3 contained 5% iron was produced by screening the iron sulfate crystals to 1.7 to 2.0 mm. Sample NP-4 contained 3% iron was produced by screening the iron sulfate crystals to 1.4 to 1.7 mm.

Sample NP-5 contained 1% iron was produced by screening the iron sulfate crystals to 1.0 to 1.2 mm.

Approximately 1 pound of each core material was placed inside the drum to form a falling curtain. The urea over-coating drum was 20" in diameter, 5" wide, 2" deep, with forty-1" lifting flights mounted 1½" apart inside the drum to assist in forming a falling curtain during melt spray granulation. The stainless steel granulation drum was mounted on a variable speed base. The drum speed during granulation was 35-40 rpm. Industrial grade urea was melted and sprayed to overcoat the core packet and produce a final product size of 2.8 mm.

Example 2. (NP-6)

A sample was produced containing 1% iron from an iron EDTA (ethylene diamine tetra acetic acid) core packet. Iron EDTA nutrient cores were produced by first granulating powdered iron EDTA with 6-7% corn syrup in a lab scale pan granulator. Sample NP-6 contained 1% iron that was produced by screening the granulated core to a particle size of 1.0 to 1.4 mm.

Approximately 1 pound of nutrient core material was placed inside the drum to form a falling curtain. The urea over-coating drum was 20" in diameter, 5" wide, 2" deep, with forty-1" lifting flights mounted 1½" apart inside the drum to assist in forming a falling curtain during melt spray granulation. The stainless steel granulation drum was mounted on a variable speed base. The drum speed during granulation was 35-40 rpm. Industrial grade urea was melted and sprayed to overcoat the core packet and produce a final product size of 2.8 mm.

Example 3. (NP-7)

A sample was produced containing 1% zinc from a zinc EDTA core packet. Zinc EDTA nutrient cores were produced by first granulating powdered zinc EDTA with 6-7% corn syrup in a lab scale pan granulator. Sample NP-7 contained 1% zinc that was produced by screening the granulated core to a particle size of 1.0 to 1.4 mm.

Approximately 1 pound of core material was placed inside the drum to form a falling curtain. The urea over-coating drum was 20" in diameter, 5" wide, 2" deep, with forty-1" lifting flights mounted 1½" apart inside the drum to assist in forming a falling curtain during melt spray granulation. The stainless steel granulation drum was mounted on a variable speed base. The drum speed during granulation was 35-40 rpm. Industrial grade urea was melted and sprayed to overcoat the core packet and produce a final product size of 2.8 mm.

Example 4. (NP-8, NP-9, and NP-10)

Samples were produced containing 1, 3, and 5% zinc from zinc sulfate core packet. Zinc sulfate nutrient cores were produced by first granulating powdered zinc sulfate with 6-7% corn syrup in a lab scale pan granulator. Sample NP-8 containing 5% zinc was produced by screening the granulated zinc sulfate to 1.4 to 1.7 mm. Sample NP-9 contained 3% zinc was produced by screening the granulated zinc sulfate to 1.2 to 1.4 mm. Sample NP-10 contained 5% zinc was produced by screening the granulated zinc sulfate to 0.7 to 1.0 mm.

Approximately 1 pound of each nutrient core material was placed inside the drum to form a falling curtain. The urea over-coating drum was 20" in diameter, 5" wide, 2" deep, with forty-1" lifting flights mounted 1½" apart inside the drum to assist in forming a falling curtain during melt spray granulation. The stainless steel granulation drum was mounted on a variable speed base. The drum speed during granulation was 35-40 rpm. Industrial grade urea was melted and sprayed to overcoat the core packet and produce a final product size of 2.8 mm.

Example 5. (NP-11, NP-12, and NP-13)

Samples were produced containing 1, 3, and 5% iodine from potassium iodide core packet. Potassium iodide crystals were screened to a pre-determined size prior to being over-coated with urea. Sample NP-11 contained 5% iodine was produced by screening the potassium iodide crystals to 1.0 to 1.2 mm. Sample NP-12 contained 3% iodine was produced by screening the potassium iodide crystals to 0.8 to 1.0 mm. Sample NP-13 contained 1% iodine was produced by screening the potassium iodide crystals to 0.6 to 0.7 mm.

Approximately 1 pound of each nutrient core material was placed inside the drum to form a falling curtain. The urea over-coating drum was 20" in diameter, 5" wide, 2" deep, with forty-1" lifting flights mounted 1½" apart inside the drum to assist in forming a falling curtain during melt spray granulation. The stainless steel granulation drum was mounted on a variable speed base. The drum speed during granulation was 35-40 rpm. Industrial grade urea was melted and sprayed to overcoat the core packet and produce a final product size of 2.8 mm.

TABLE 2

Product Examples of Nutrient Core Packet

| Product# | Nutrient Composition (%) | Nutrient Source | Product Composition (%) |
|---|---|---|---|
| NP 7 | 1% Zn | ZincEDTA | 6.9% Zinc EDTA, 93.1% Urea |
| NP 10 | 1% Zn | Zinc Sulfate | 2.8% Zinc Sulfate, 97.2% Urea |
| NP 9 | 3% Zn | Zinc Sulfate | 8.5% Zinc Sulfate, 91.5% Urea |
| NP 8 | 5% Zn | Zinc Sulfate | 14.1% Zinc Sulfate, 85.9% Urea |
| NP 6 | 1% Fe | Iron EDTA | 7.5% Iron EDTA, 92.5% Urea |
| NP 5 | 1% Fe | Iron Sulfate | 5.0% Iron Sulfate, 95% Urea+ |
| NP 4 | 3% Fe | Iron Sulfate | 10% Iron Sulfate, 90% Urea+ |
| NP 3 | 5% Fe | Iron Sulfate | 15% Iron Sulfate, 85% Urea+ |
| NP 13 | 1% I | Potassium Iodide | 1.3% Potassium Iodide, 98.7% Urea+ |
| NP 12 | 3% I | Potassium Iodide | 3.9% Potassium Iodide, 96.1% Urea+ |
| NP 11 | 5% I | Potassium Iodide | 6.5% Potassium Iodide, 93.5% Urea+ |
| NP 14 | 1% Vitamin A | Gel Capsules | 90% Urea, 1% Vitamin A, 9% Inert |
| NP 15 | 1% Zn, 1% Fe | Zinc Sulfate, Iron Sulfate | 2.8% Zinc Sulfate, 5.0% Iron Sulfate, 92.2% Urea |
| NP 16 | 2% Zn, 2% Fe | Zinc Sulfate, Iron Sulfate | 5.6% Zinc Sulfate, 10% Iron Sulfate, 84.4% Urea |

Notes:
1) MAP—Monoammonium Phosphate
2) EDTA—ethylenediaminetetra acetic acid
3) Zn—Zinc
4) Fe—Iron
5) I—Iodine
6) B—Boron
7) N—Nitrogen
8) P—Phorphous
+Binder of Corn Syrup was employed to granulate core constitutents Example 6. Zinc Uptake in Spinach Plants from Application of Fertilizer Containing Animal Nutrient Core Packet In this example tests were performed to quantify the incorporation of zinc in a common spinach variety (Bloomsdale Long-Standing) employing compositions of the present invention. The tests quantified the increase in leaf zinc content due to application of compositions of the present invention containing zinc. The impact of the present compositions on spinach biomass increase was not the primary objective. In addition to applications of the present compositions to soil, for comparative purposes, foliar application of zinc solutions were applied to spinach leaves. Direct foliar applications provide an indication of potentially maximum amounts of zinc uptake into the leaves. A list of the sample products of the present application is shown in Table 2.

MATERIALS AND METHODS

1. Soil 8 kg Greenville loam (fine, kaolinitic, thermic Rhodie Kandiudults), pH=6.2, organic matter=1.4%, CEC=5.2 cmol $kg^{-1}$. The soil has been depleted of nutrients by previous cropping of tomatoes and cabbage.

2. Experimental Units

The spinach was grown in 8-kg pots. Each pot was transplanted with two spinach seedlings on Mar. 5, 2010

3. Blanket Fertilizer Rates—Basal

All fertilizer materials were laboratory grade reagents to avoid contamination and antagonistic interaction with Zn, Fe and/or I.

Nitrogen: 250 mg N $kg^{-1}$ or 2 g N $por^{-1}$. All N was applied basally and incorporated into the top 10 cm of the soil.

Phosphorus: 100 mg P $kg^{-1}$ or 0.8 g P $por^{-1}$ applied as monocalcium phosphate (all basal and incorporated into the entire 8 kg of soil).

Potassium: 415 mg K $kg^{-1}$ or 3.3 g K $por^{-1}$ applied as potassium sulfate (all basal and incorporated into the entire 8 kg of soil).

Magnesium: 30 mg Mg $kg^{-1}$ or 0.24 g Mg $por^{-1}$ applied as $MgSO_4.7H_2O$ (all basal and incorporated into the entire 8 kg of soil).

Calcium: Monoammonium phosphate (MCP) applied for P.

Sulfer: From sulfate of potash (SOP) and $MgSO_4$.

Micronutrients: As per treatment (see Table 3).

4. Basal Zn Fertilizer Rates

Zinc: 20 mg Zn $kg^{-1}$ or 0.16 g Zn $por^{-1}$ applied as $ZnSO_4$ 7 $H_2O$ solution on topsoil just prior to transplanting for three treatments only (Table 3).

5. Foliar Rates for Zn, Fe, I and Vitamin A

Foliar applications were used in treatments that have a foliar component as indicated in Table 3.

6. Experimental Design

Randomized complete block with 40 treatments and three replications for a total of 120 experimental units.

7. Crop Data Analysis

The fresh and dried weight of spinach leaves was determined and analyzed for N, P, K, Zn, Fe and I.

TABLE 3

| | | Treatment Description | | | | | | | | |
|---|---|---|---|---|---|---|---|---|---|---|
| | | Basal | | | | | Foliar | | | |
| Treatment No. | Treatment Description | N Prod | SOP | MCP (g) | MgSO$_4$ | ZnSO$_4$ | Zn | KI | Fe (ppm) | Vit A |
| 1 | Urea + 5Zn | 4.31 | 8 | 3.25 | 2.46 | 0.00 | 5 | | | |
| 2 | Urea + 10Zn | 4.31 | 8 | 3.25 | 2.46 | 0.00 | 10 | | | |
| 3 | Urea + 20Zn | 4.31 | 8 | 3.25 | 2.46 | 0.00 | 20 | | | |
| 4 | Urea + 40Zn | 4.31 | 8 | 3.25 | 2.46 | 0.00 | 40 | | | |
| 5 | Urea + 60Zn | 4.31 | 8 | 3.25 | 2.46 | 0.00 | 60 | | | |
| 6 | Urea + 10KI | 4.31 | 8 | 3.25 | 2.46 | 0.00 | | 10 | | |
| 7 | Urea + 20KI | 4.31 | 8 | 3.25 | 2.46 | 0.00 | | 20 | | |
| 8 | Urea + 30KI | 4.31 | 8 | 3.25 | 2.46 | 0.00 | | 30 | | |
| 9 | Urea + 40KI | 4.31 | 8 | 3.25 | 2.46 | 0.00 | | 40 | | |
| 10 | Urea + 100Fe | 4.31 | 8 | 3.25 | 2.46 | 0.00 | | | 100 | |
| 11 | Urea + 300Fe | 4.31 | 8 | 3.25 | 2.46 | 0.00 | | | 300 | |
| 12 | Urea + 100 Vit A | 4.31 | 8 | 3.25 | 2.46 | 0.00 | | | | 100 |
| 13 | Urea + 200 Vit A | 4.31 | 8 | 3.25 | 2.46 | 0.00 | | | | 200 |
| 14 | Urea | 4.31 | 8 | 3.25 | 2.46 | 0.00 | 0 | 0 | 0 | 0 |
| 15 | NP3 | 4.77 | 8 | 3.25 | 2.46 | 0.00 | | | | |
| 16 | NP4 | 4.88 | 8 | 3.25 | 2.46 | 0.00 | | | | |
| 17 | NP5 | 4.74 | 8 | 3.25 | 2.46 | 0.00 | | | | |
| 18 | NP6 | 4.82 | 8 | 3.25 | 2.46 | 0.00 | | | | |
| 19 | NP7 | 4.74 | 8 | 3.25 | 2.46 | 0.00 | | | | |
| 20 | NP8 | 4.95 | 8 | 3.25 | 2.46 | 0.00 | | | | |
| 21 | NP9 | 4.72 | 8 | 3.25 | 2.46 | 0.00 | | | | |
| 22 | NP10 | 4.61 | 8 | 3.25 | 2.46 | 0.00 | | | | |
| 23 | NP11 | 5.30 | 7.78 | 3.25 | 2.46 | 0.00 | | | | |
| 24 | NP12 | 5.23 | 7.79 | 3.25 | 2.46 | 0.00 | | | | |
| 25 | NP13 | 4.74 | 7.93 | 3.25 | 2.46 | 0.00 | | | | |
| 26 | NP14 | 4.66 | 8.00 | 3.25 | 2.46 | 0.00 | | | | |
| 27 | NP15 | 5.00 | 8.00 | 3.25 | 2.46 | 0.00 | | | | |
| 28 | NP16 | 4.72 | 8.00 | 3.25 | 2.46 | 0.00 | | | | |
| 29 | NP17 (void) | 4.95 | 7.98 | 3.25 | 2.46 | 0.00 | | | | |
| 30 | NP1 (void) | 5.29 | 8.00 | 2.83 | 2.46 | 0.00 | | | | |
| 31 | NP2 (void) | 4.91 | 7.97 | 2.94 | 2.46 | 0.00 | | | | |
| 32 | NP4 + FOL | 4.88 | 8 | 3.25 | 2.46 | 0.00 | | | 12.62 | |
| 33 | NP6 + FOL | 4.82 | 8 | 3.25 | 2.46 | 0.00 | | | 4.15 | |
| 34 | NP8 + FOL | 4.95 | 8 | 3.25 | 2.46 | 0.00 | 19.11 | | | |
| 35 | NP9 + FOL | 4.72 | 8 | 3.25 | 2.46 | 0.00 | 9.98 | | | |
| 36 | NP12 + FOL | 5.23 | 7.79 | 3.25 | 2.46 | 0.00 | | 34.87 | | |
| 37 | NP13 + FOL | 4.74 | 7.93 | 3.25 | 2.46 | 0.00 | | 11.61 | | |
| 38 | NP4 + 20 ppm Zn | 4.88 | 8 | 3.25 | 2.46 | 0.70 | | | | |
| 39 | NP12 + 20 ppm Zn | 5.23 | 7.79 | 3.25 | 2.46 | 0.70 | | | | |
| 40 | NP13 + 20 ppm Zn | 4.74 | 7.93 | 3.25 | 2.46 | 0.70 | | | | |

RESULTS AND DISCUSSION

Zinc Response on Spinach Dry Matter Production

With Fe seed-core we had a poor response to Fe application in terms of yield because The soil used for these tests had a sufficient amount of iron and thus did not require any application of Fe fertilization. The addition of the iron product samples resulted in too much iron and had a negative impact on the spinach plants. The amount of iodine in the iodine product samples were too high and had a negative impact on the spinach plants. The types and amounts of nutrients in the products of the present invention can be adjusted to supply the amount of nutrient within the range of increasing nutrients within the plant and less than the inhibitory amount of nutrient. This experiment was not planned to provide for such adjustment to initial soil nutrient content and spinach maximum tolerance to the nutrient.

The positive results of the present zinc sample applications with spinach (spinach enrichment with zinc) shows that the present nutrient core products supplies the needed nutrient to the crop when applied directly to the soil. The positive enrichment results of the zinc product samples with spinach are representative of the validity of the present approach and would reasonably have a similarly positive result using iron, iodine and other nutrients based on soil characteristics and crop plant requirements. Plants can be enriched with nutrient content (e.g. Zn content in spinach) employing the present nutrient core fertilizer products as long as application amounts do not have a negative impact on growth. Hence, there is no need to prove the nutrient core products for each individual nutrient.

Due to the negative impact of I and Fe, particularly at higher application rates, the results for Zn sample application presented in Table 4 are for treatments without Fe and I. All foliar Znapplications led to a significant increase in spinach dry matter production (Table 4). Soil application of Zn product samples was not as effective causing no significant (positive or negative) response on spinach dry matter production. However, the combination of soil application of product samples and foliar applications of iron, zinc or iodine (see Table 3, Treatments 32-37) resulted in increased dry matter production. The samples NP 4, NP 12, and NP 13 contained iron or iodine products used in Treatments 38-40 and did not have any Zn. Accordingly, 20 ppm Zn was applied to the soil (basal), but the iron and iodine apparently had the aforementioned negative effect.

Since the soil used for this experiment was not deficient in Zn for plant growth, it was expected that soil application of Zn product samples did not result in any significant response for dry matter production.

Zinc Fertilization Effect on Spinach Zn Concentration

There was a significant increase in the Zn concentration of spinach leaf with Zn application whether applied as foliar, soil applied product samples or the combination of soil and foliar applications (Table 4). The spinach leaf Zn concentration without any Zn application was 42 ppm. Standard Zn concentration for spinach leaf is about 40-45 ppm. Based on the leaf Zn concentration, the employed soil not Zn deficient, supplied an adequate amount of Zn for spinach growth.

TABLE 4

Effect of Foliar and Soil Zn Application on Spinach Dry Matter Production and Tissue Zn Content

| Treatment | Method of Application | Total Dry Matter (g pot$^{-1}$) | (% increase) | Zn Concentration (ppm) | (% increase) |
|---|---|---|---|---|---|
| 0 ppm Zn | — | 12.82 | 0 | 42.0 | 0 |
| 5 ppm Zn | Foliar | 16.70 | 30.3* | 121.5 | 189.4 |
| 10 ppm Zn | Foliar | 15.17 | 18.3* | 195.8 | 366.2 |
| 20 ppm Zn | Foliar | 15.14 | 18.1* | 403.2 | 860.1 |
| 40 ppm Zn | Foliar | 15.19 | 18.5* | 730.8 | 1,640.4 |
| 60 ppm Zn | Foliar | 15.94 | 24.3* | 1,067.3 | 2,441.9 |
| NP7 (6.9% Zn EDTA) | Soil | 11.2 | −12.5 | 219.9 | 423.7 |
| NP8 (14.1% ZnSO4) | Soil | 12.74 | −0.6 | 188.9 | 349.9 |
| NP9 (8.5% ZnSO4) | Soil | 12.09 | −5.7 | 147.8 | 252.0 |
| NP10 (2.8% ZnSO4) | Soil | 13.06 | 1.9 | 98.4 | 134.4 |
| NP8 + 19 ppm Zn | Soil + Foliar | 13.98 | 9.0 | 429.3 | 922.5 |
| NP9 + 10 ppm Zn | Soil + Foliar | 14.47 | 12.9* | 258.4 | 515.4 |

*Significant difference in spinach dry weight. All Zn-fertilized spinach plants had significantly higher tissue Zn concentration.

However, additional application of Zn (soil alone (product samples), foliar alone and combination of soil and foliar) resulted in Zn enrichment of the spinach, with spinach concentration at two to 25 times higher than the standard. For example, at 60 ppm Zn foliar application, the spinach tissue Zn concentration was 1,067 ppm compared to 42 ppm without any Zn application. Soil application of Zn with Zn product samples (NP 7-10) resulted in significant increases in tissue Zn concentration—from 2.3 to 5.2 times higher than with the control, zero amount Zn treatment. As the concentration of Zn applied as $ZnSO_4$ in the Zn product samples NP 10, 9, 8 increased (calculated as percent zinc: from 0.9% to 1.7% to 3.1%), the corresponding increase in leaf tissue Zn concentration was 98 ppm, 148 ppm and 189 ppm (Table 4). When the zinc product sample NP 7 having Zn as Zn EDTA (calculated as 0.8% zinc), was applied, a resulting plant tissue Zn concentration of 220 ppm was achieved. Zinc EDTA as the Zn source in the nutrient core for Zn product was more effective than $ZnSO_4$ in increasing Zn tissue content in spinach (Table 4).

None of the treatments with Zn application alone resulted in a significant decline in spinach dry matter. The high tissue Zn concentration resulting in this experiment was not at the expense of reduced dry matter production.

Effect of Zinc Application on Zinc Uptake by Spinach

The positive effect of Zn application as foliar, soil or combination is reflected in the higher Zn uptake by spinach in all treatments compared to the standard—0 ppm Zn treatment (Table 5). The results clearly show that a common spinach variety can accumulate Zn without any negative impact on dry matter production but with potential nutritional and health benefits to humans. The nutrient core Zn product was an effective Zn nutrient core fertilizer for soil application resulting in Zn enriched plants.

TABLE 5

Effect of Zn Application as Foliar, on Soil or in Combination on Zn Uptake by Spinach

| Treatment | Method of Application | Zn Uptake (mg/pot) |
|---|---|---|
| 0 ppm Zn | — | 0.52 |
| 5 ppm Zn | Foliar | 2.02 |
| 10 ppm Zn | Foliar | 2.96 |
| 20 ppm Zn | Foliar | 6.11 |
| 40 ppm Zn | Foliar | 10.89 |
| 60 ppm Zn | Foliar | 17.74 |
| NP7 (6.9% Zn EDTA) | Soil | 2.45 |
| NP8 (14.1% ZnSO4) | Soil | 2.33 |
| NP9 (8.5% ZnSO4) | Soil | 1.77 |
| NP10 (2.8% ZnSO4) | Soil | 1.25 |
| NP8 + 19 ppm Zn | Soil + Foliar | 5.98 |
| NP9 + 10 ppm Zn | Soil + Foliar | 3.65 |
| NP15 (2.8% ZnSO4, 5% FeSO4) | Soil | 1.28 |

Table 5 also shows that due to Fe toxicity in the NP15 product, it was possible to get a significantly higher Zn concentration, significantly lower dry matter and yet higher Zn uptake than with 0 ppm Zn treatment. However, such practice would not be commercially feasible (increased cost due to micronutrient and with lower yield).

CONCLUSIONS

The results from this study, summarized in Table 4, clearly show that both application of the Zn core nutrient fertilizer products and Zn foliar application resulted in Zn enrichment of spinach.

Application the Zn core nutrient fertilizer products and Zn foliar application resulted in a several-fold increase in Zn concentration in spinach leaf and increased uptake of Zn compared to the standard treatment (no Zn application), even though the soil was not Zn-deficient. Zn foliar applications resulted in higher spinach growth and higher Zn content than soil application. For leafy vegetables, the greater effectiveness with foliar application is expected.

However, for cereals, the effectiveness of foliar application may not be as great due to greater losses (leaf contact), cost of application and translocation of Zn from leaves to grains. Zn EDTA was more effective than $ZnSO_4$ as a Zn source in soil applied Zn nutrient core product.

While only a few exemplary embodiments of this invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

The invention claimed is:

1. A process to produce fertilizer product granules, comprising:
   a) providing core particles, wherein the core particles comprise core packets that consist of one or more animal nutrients or consist of a mixture of one or more one animal nutrients and a binder, wherein the one or more animal nutrients are selected from the group consisting of vitamin A, vitamin C, vitamin D, vitamin E, vitamin K, thiamin, riboflavin, niacin, vitamin B6, folic acid, vitamin B12, biotin, pantothenic acid, iron, iodine, magnesium, zinc, selenium, copper, manganese, chromium, molybdenum, boron, nickel, silicon, tin, vanadium, lutein, lycopene, and salts, chelates and combinations thereof, wherein the core packets having a surface are coated with a first coating comprising 84.4% to 98.7% urea;

b) introducing the core particles into a urea granulation process; and c) spraying the core particles with a second coating comprising melted urea in said urea granulation process to yield granules, wherein the second coating is different in composition from the first coating and comprises one or more plant nutrients selected from the group consisting of a phosphorus compound, a potassium compound, a supplemental nitrogen compound, and a combination thereof;

wherein the urea granulation process is carried out in a fluid bed.

2. The process of claim 1, wherein step a) comprises:

a1) providing the core packets, and a2) spraying a coating material comprising 84.4% to 98.7% melted urea onto the surface of the core packets to form the core particles in a granulation drum, wherein step b) comprises introducing the core particles into the fluid bed granulator.

3. The process of claim 1, wherein said core particles have a size of 0.9 mm to 1.5 mm.

4. The process of claim 1, wherein said step c) further comprises increasing the size of the core particles to yield fertilizer granules with a size of 2.50 mm to 3.60 mm.

5. A process to prepare a particulate fertilizer for supplying animal nutrients to plants, said process comprising:

a) screening core particles to preselected particles having a preselected particle size, said preselected particles having a surface, wherein the core particles consist of one or more animal nutrients or consist of a mixture of one or more one animal nutrients and a binder, wherein the one or more animal nutrients are selected from the group consisting of vitamin A, vitamin C, vitamin D, vitamin E, vitamin K, thiamin, riboflavin, niacin, vitamin B6, folic acid, vitamin B12, biotin, pantothenic acid, iron, iodine, magnesium, zinc, selenium, copper, manganese, chromium, molybdenum, boron, nickel, silicon, tin, vanadium, lutein, lycopene, and salts, chelates and combinations thereof;

b) spraying a first melted urea onto the surface of the preselected particles to produce a first urea coating thus obtaining once-coated particles, wherein the first melted urea comprises 84.4% to 98.7% urea;

c) granulating the once-coated particles to produce once-coated granules, said once-coated granules having a surface;

d) cooling the once-coated granules;

e) spraying a second melted urea onto the surface of the once-coated granules to produce a second coating and obtain twice-coated particles, wherein the second melted urea is different in composition from the first melted urea and comprises one or more plant nutrients selected from the group consisting of a phosphorus compound, a potassium compound, a supplemental nitrogen compound, and a combination thereof;

f) granulating the twice-coated particles to produce twice-coated granules; and g) cooling the twice-coated granules, wherein steps e) and f) are performed in a fluid bed granulator.

6. The process of claim 5, further including, prior to step a), preparing said core particles by granulating a mixture consisting of said one or more one animal nutrients and said binder.

7. The process of claim 5, wherein the cooling of step g) is carried out in a fluid bed cooler.

8. The process of claim 5, wherein the once-coated granules have a size in the range of 0.9 mm to 1.5 mm.

9. The process of claim 5, wherein the twice-coated core granules have a size in the range of 2.5 mm to 3.6 mm.

* * * * *